(12) United States Patent
Romano et al.

(10) Patent No.: US 10,915,848 B2
(45) Date of Patent: Feb. 9, 2021

(54) APPARATUS SUPPORTING RESTAURANT INCUBATION AND RELATED METHODS

(71) Applicant: TRINITY GROVES RESTAURANT INCUBATOR PARTNERS, LP, Dallas, TX (US)

(72) Inventors: Philip J. Romano, Dallas, TX (US); J. Stuart Fitts, Dallas, TX (US)

(73) Assignee: Trinity Groves Restaurant Incubator Partners, LP, Dallas, TX (US)

( * ) Notice: Subject to any disclaimer, the term of this patent is extended or adjusted under 35 U.S.C. 154(b) by 605 days.

(21) Appl. No.: 14/688,619

(22) Filed: Apr. 16, 2015

(65) Prior Publication Data

US 2015/0302339 A1  Oct. 22, 2015

Related U.S. Application Data

(60) Provisional application No. 61/980,456, filed on Apr. 16, 2014.

(51) Int. Cl.
| | |
|---|---|
| *G06Q 10/06* | (2012.01) |
| *G06Q 10/10* | (2012.01) |
| *H04W 48/16* | (2009.01) |
| *H04W 92/06* | (2009.01) |

(52) U.S. Cl.
CPC .............................. *G06Q 10/06395* (2013.01)

(58) Field of Classification Search
CPC .. G06Q 10/06; G06Q 10/00; G06Q 10/06395; G06Q 10/06311; G06Q 50/12
See application file for complete search history.

(56) References Cited

U.S. PATENT DOCUMENTS

| | | | | |
|---|---|---|---|---|
| 6,973,437 | B1* | 12/2005 | Olewicz | G06Q 30/02 |
| | | | | 705/15 |
| 7,240,025 | B2* | 7/2007 | Stone | G06Q 10/00 |
| | | | | 705/14.1 |
| 8,468,062 | B1* | 6/2013 | Kamdar | G06Q 30/0605 |
| | | | | 705/26.2 |
| 10,373,281 | B2* | 8/2019 | Lutnick | G06Q 20/202 |
| 2003/0078793 | A1* | 4/2003 | Toth | G06Q 50/12 |
| | | | | 705/15 |
| 2004/0143503 | A1* | 7/2004 | Suthar | G06Q 50/12 |
| | | | | 705/15 |
| 2005/0004830 | A1* | 1/2005 | Rozell | G06Q 10/02 |
| | | | | 705/7.34 |
| 2005/0080676 | A1* | 4/2005 | Lovegreen | G06Q 50/12 |
| | | | | 705/15 |
| 2007/0011172 | A1* | 1/2007 | Ruul | G06Q 30/00 |

(Continued)

*Primary Examiner* — Pan G Choy

(57) ABSTRACT

An apparatus includes at least one memory configured to store information identifying performances of multiple restaurants associated with an incubator project. The apparatus also includes at least one processor configured to correlate the performances of the restaurants over time to identify when one restaurant's performance is dependent upon one or more other restaurants' performances. The at least one processor could be configured to correlate the performances of the restaurants by correlating peak customer visits to the restaurants over time. The at least one processor could also be configured to correlate the peak customer visits to identify whether a specified one of the restaurants is visited more frequently when others of the restaurants are busier.

18 Claims, 9 Drawing Sheets

(56) References Cited

U.S. PATENT DOCUMENTS

| | | | |
|---|---|---|---|
| 2009/0292566 A1* | 11/2009 | Bossert | G06Q 10/02 705/5 |
| 2010/0257013 A1* | 10/2010 | Beauregard | G06Q 10/02 705/7.13 |
| 2011/0258011 A1* | 10/2011 | Burns | G06Q 50/12 705/7.15 |
| 2012/0191552 A1* | 7/2012 | Lutnick | G06Q 30/0601 705/15 |
| 2013/0030874 A1* | 1/2013 | Lin | G06Q 10/06 705/7.38 |
| 2013/0304536 A1* | 11/2013 | Hamachi | G06Q 20/3224 705/7.29 |
| 2014/0046789 A1* | 2/2014 | Baliga | G06Q 30/06 705/26.1 |
| 2014/0257877 A1* | 9/2014 | L'Heureux | G06Q 50/12 705/5 |
| 2014/0343976 A1* | 11/2014 | Ahluwalia | G06Q 10/02 705/5 |
| 2015/0294394 A1* | 10/2015 | Shreve | G06K 9/00671 705/26.81 |
| 2015/0363720 A1* | 12/2015 | Fairbanks | G06Q 10/063116 705/7.13 |
| 2015/0363735 A1* | 12/2015 | Fairbanks | G06Q 10/06393 705/7.39 |
| 2016/0371425 A1* | 12/2016 | Tomkins | G06Q 30/0282 |

* cited by examiner

APPARATUS SUPPORTING RESTAURANT INCUBATION AND RELATED METHODS

CROSS-REFERENCE TO RELATED APPLICATION AND PRIORITY CLAIM

This application claims priority under 35 U.S.C. § 119(e) to U.S. Provisional Patent Application No. 61/980,456 filed on Apr. 16, 2014. This provisional patent application is hereby incorporated by reference in its entirety.

TECHNICAL FIELD

This disclosure relates generally to the restaurant industry. More specifically, this disclosure relates to an apparatus supporting restaurant incubation and related methods.

BACKGROUND

The restaurant industry is highly competitive, and it is often very difficult and expensive for new restaurant operators to enter the marketplace. Simply obtaining a franchise for an established restaurant and opening one such restaurant typically costs hundreds of thousands or even millions of dollars. Moreover, restaurant franchisors are often unwilling to grant franchises to inexperienced restaurant operators. In addition, inexperienced or other restaurant operators often find it difficult or impossible to obtain the funding necessary to open a restaurant with a new restaurant concept.

SUMMARY

This disclosure provides an apparatus supporting restaurant incubation and related methods.

In a first embodiment, an apparatus includes at least one memory configured to store information identifying performances of multiple restaurants associated with an incubator project. The apparatus also includes at least one processor configured to correlate the performances of the restaurants over time to identify when one restaurant's performance is dependent upon one or more other restaurants' performances.

In a second embodiment, a non-transitory computer readable medium embodies a computer program. The computer program includes computer readable program code for obtaining information identifying performances of multiple restaurants associated with an incubator project. The computer program also includes computer readable program code for correlating the performances of the restaurants over time to identify when one restaurant's performance is dependent upon one or more other restaurants' performances.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of this disclosure and its advantages, reference is now made to the following description taken in conjunction with the accompanying drawings, in which like reference numerals represent like parts.

DETAILED DESCRIPTION

FIGS. 1 through 12, discussed below, and the various embodiments used to describe the principles of this disclosure in this patent document are by way of illustration only and should not be construed in any way to limit the scope of the disclosure. Those skilled in the art will understand that the principles of this disclosure may be implemented in any suitably arranged device or system.

A restaurant incubator represents an entity that helps inexperienced or other restaurant operators open new restaurants. For example, the restaurant incubator could provide funding, facilities, or other resources used by restaurant operators to open new restaurants, typically in exchange for an ownership interest in the new restaurants. Moreover, in some embodiments, an apparatus representing a computing device is used to support a restaurant incubator in various ways. For instance, the computing device could collect information associated with operations of the restaurants or related services, provide common services for the restaurant operators, and track and analyze the performances of the restaurants over time. Among other things, these types of operations can be used to support decisions regarding the expansion or replacement of restaurants associated with the restaurant incubator.

Figure 1:
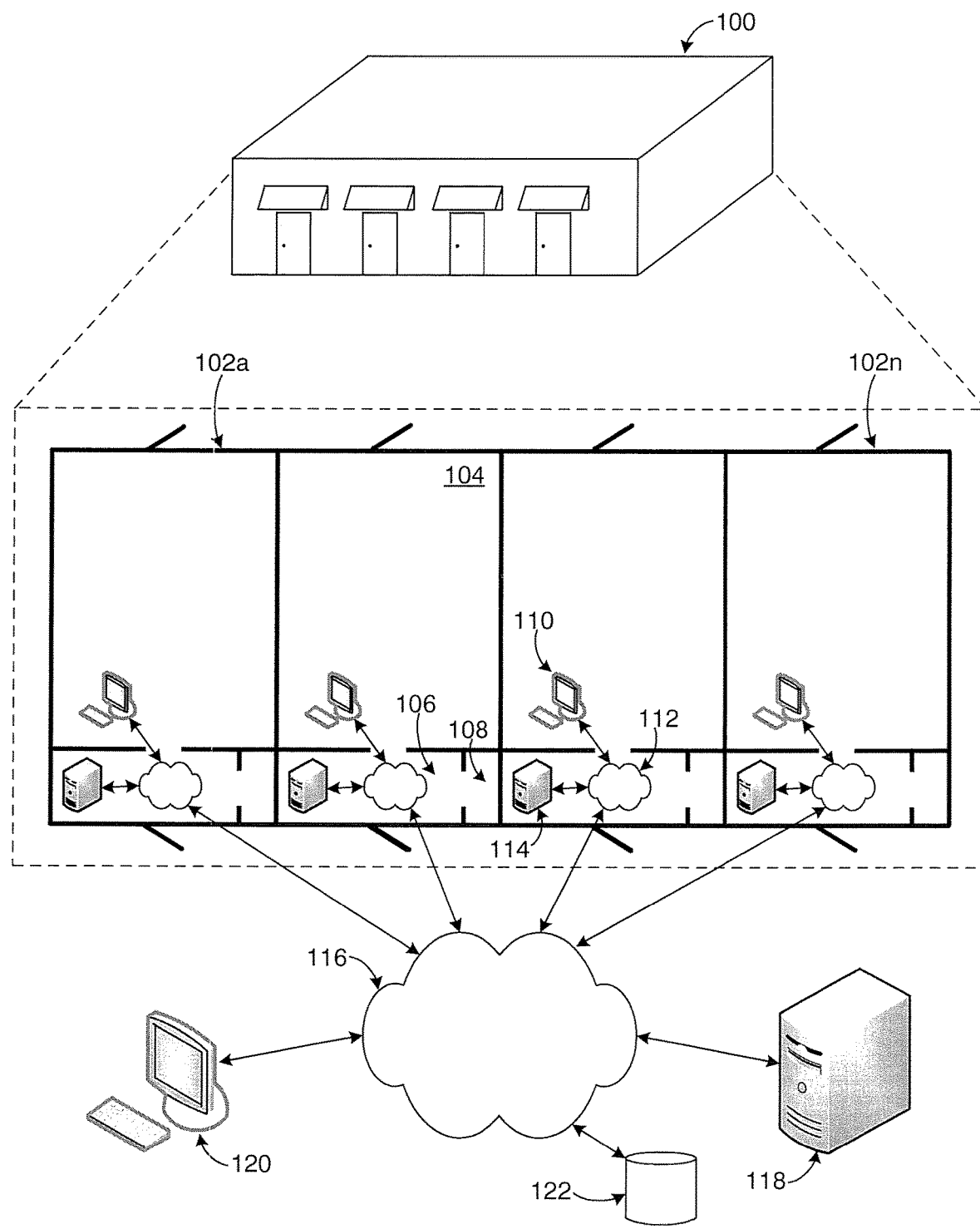
FIG. 1 illustrates an example facility used by a restaurant incubator in accordance with this disclosure.

FIG. 1 illustrates an example facility 100 used by a restaurant incubator in accordance with this disclosure. As shown in FIG. 1, the facility 100 generally represents a structure that can be subdivided into a number of restaurant spaces 102a-102n. The number of restaurant spaces 102a-102n can depend on the desired size of each restaurant space and the size of the facility 100. The facility 100 generally includes any suitable space in which one or more restaurants can be established. As particular examples, the facility 100 could represent a converted warehouse, bus terminal, or truck terminal. Note, however, that the facility 100 could represent any other suitable structure, including a structure built specifically to house one or more restaurants. Also note that while a single facility 100 is shown in FIG. 1, there could be multiple structures associated with a restaurant incubator, and each structure could be used with one or multiple restaurants.

Each restaurant space 102a-102n represents an area where a restaurant can be established and operated. The restaurant spaces 102a-102n here reside within different portions of the facility 100, but the restaurants operating in those spaces 102a-102n could share common features. For example, one or more common parking lots could be supported by the restaurants operating in the spaces 102a-102n. The restaurants operating in the spaces 102a-102n could also jointly pay for security personnel, valet services, or other services jointly used, supported by, or benefiting the restaurants.

In this example, each restaurant space 102a-102n includes at least one dining area 104 in which customers can be served food and drink items. A dining area 104 may or may not include a bar area that serves alcoholic drinks. Each restaurant space 102a-102n also includes at least one kitchen area 106 in which food items are prepared, dishes are washed and stored, and other operations can be performed. In addition, each restaurant space 102a-102n includes at least one storage area 108 in which food ingredients, drink supplies, and other supplies are stored. Note that the sizes, shapes, and arrangement of the different areas within each restaurant space 102a-102n are for illustration only. While FIG. 1 illustrates one example configuration of the restaurant spaces 102a-102n, each restaurant space 102a-102n and each area within a restaurant space 102a-102n could have any suitable size, shape, and configuration.

In some implementations, each restaurant space 102a-102n could have substantially the same size, shape, or arrangement. As a result, restaurants in the restaurant spaces 102a-102n could be generally able to serve approximately the same number of customers at any given time. This could allow, for example, a more direct comparison of the different restaurants' performances over time. Also, restaurants that operate within the restaurant spaces 102a-102n could operate using much of the same types of equipment (such as stoves, ovens, refrigerators, and freezers). This could allow, for instance, a new restaurant to more quickly take over the space of a prior restaurant if and when the prior restaurant closes or otherwise ceases operations. Note, however, that these characteristics are not required in the facility 100.

Although not shown, the facility 100 could also include one or more non-restaurant spaces. For example, there could be common spaces shared by multiple restaurants, such as one or more waiting areas where customers can wait for seating in the restaurants.

As shown in FIG. 1, each restaurant space 102a-102n includes or is used in conjunction with one or more computing devices 110. The computing devices 110 could be used to support various operations of a restaurant operating within a given restaurant space 102a-102n. For example, the computing devices 110 could be used by restaurant personnel to enter customers' food and drink orders into an order processing system. The computing devices 110 could also be used by restaurant personnel to initiate credit card or debit card payments or other transactions. The computing devices 110 could further be used to track usage of supplies, predict future supply needs, track sales over time, schedule and track employee workshifts, or generally perform any other or additional functions associated with restaurant operations.

Each device 110 represents any suitable processing or computing device for use in a restaurant environment. For example, the computing devices 110 are shown here as representing desktop computers. However, any other suitable computing devices could be used, such as laptop computers, tablet computers, smartphones, personal digital assistants, or other fixed or portable devices.

The computing devices 110 within each restaurant space 102a-102n could communicate over a network 112. Each network 112 represents any suitable network or networks over which computing devices 110 associated with a restaurant space 102a-102n could communicate. Each network 112 could also be used by other devices, such as devices used by customers located within or near a restaurant space 102a-102n. Any suitable network or combination of networks could be used in a restaurant space 102a-102n. For example, the network 112 could include a wired Ethernet network or other wired network and/or a WiFi network or other wireless network.

At least one server computer 114 could communicate over the network 112 in a restaurant space 102a-102n and provide various functions. For example, a server computer 114 could execute an order processing application for routing food orders to kitchen personnel and drink orders to bar personnel. A server computer 114 could also execute applications for tracking reservations, logging information about credit/debit card transactions, tracking sales figures, and tracking employee information (such as personal information, salary information, hours worked, and upcoming work shifts). A server computer 114 could execute any other or additional applications as needed or desired. Each server computer 114 includes any suitable computing device.

As shown in FIG. 1, a network 116 supports communications between the various devices and networks in the restaurant spaces 102a-102n and a server computer 118. The network 116 represents any suitable network or networks, such as a wired Ethernet network, a wireless WiFi network, or the Internet.

The server computer 118 performs various functions to support the operations of a restaurant incubator. As noted above, a restaurant incubator represents an entity that helps inexperienced or other restaurant operators open new restaurants. For example, the restaurant incubator could own, rent, or lease the facility 100 or the land on which the facility 100 is located. The restaurant incubator could also select which restaurant operators are allowed to open restaurants in the spaces 102a-102n. The restaurant incubator could further provide financial assistance or other assistance to the operators in order to help the operators open and manage the restaurants in the spaces 102a-102n.

The server computer 118 can perform different types of functions to help the restaurant incubator operate efficiently. For example, the server computer 118 could collect information about the operations of the restaurants for use in analyzing the performance and growth of each restaurant over time. The server computer 118 could also collect supply information from the restaurants so that orders can be collectively placed with suppliers. The server computer 118 could perform a wide variety of other functions, examples of which are described in more detail below. The server computer 118 represents any suitable computing device.

At least one computing device 120 could be used by personnel associated with the restaurant incubator. For example, a computing device 120 could be used by restaurant incubator personnel to track and review the restaurants' performances over time in order to make decisions about whether certain restaurants are to be expanded or replaced. A computing device 120 could be used in any other suitable manner to interact with the server computer 118. Each computing device 120 represents any suitable computing device, such as a desktop computer, laptop computer, tablet computer, smartphone, personal digital assistant, or other fixed or portable device.

At least one database 122 is used to store various information used, generated, or collected by one or more components in the system 100. For example, the database 122 could be used to store information collected by the server computer 118 from the computing devices 110 and the server computers 114. The database 122 could also be used to store information provided by one or more users via the computing devices 120. Each database 122 includes any suitable structure for storing and facilitating retrieval of information.

In some embodiments, the computing devices 110 or the server computers 114 associated with the restaurants being operated in the spaces 102a-102n could access the server computer 118 and the database 122. This may allow, for example, the restaurant operators to view and update their associated data on the database 122. Appropriate access control mechanisms could be supported by the server computer 118 or the database 122 to ensure that personnel associated with each restaurant can only access, modify, or delete that restaurant's data.

Various additional details regarding the incubation of restaurants in general are provided below. Also, various additional details regarding the operations that can occur using the server computer 118 in particular are provided below.

Although FIG. 1 illustrates one example of a facility 100 used by a restaurant incubator, various changes may be made to FIG. 1. For example, as noted above, one or more facilities 100 could be used, any number of restaurant spaces could be included in each facility, and each restaurant space could have any suitable arrangement. Also, a mixture of restaurant spaces could be used, such as when stand-alone restaurant spaces are used in conjunction with one or more shared facilities. Further, the functional division shown in FIG. 1 is for illustration only, and various components in FIG. 1 could be combined, subdivided, omitted, or rearranged and additional components could be added according to particular needs. For instance, each restaurant space need not have its own network 112 and/or server computers 114. A common network 112 could be used to supply network services to multiple restaurant spaces, or the networks 112 could be combined with the network 116. Similarly, the server computer 118 could implement the functions of one or more of the server computers 114.

Figure 2:
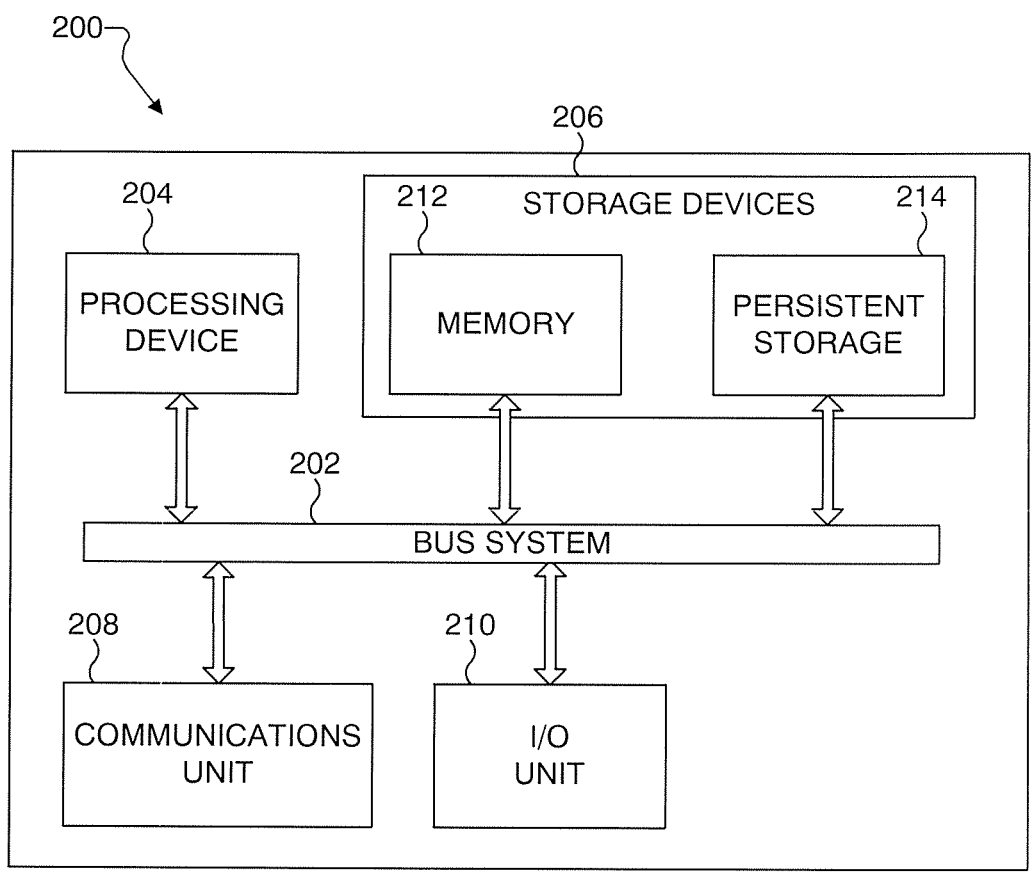
FIG. 2 illustrates an example computing device supporting operations associated with a restaurant incubator in accordance with this disclosure.

FIG. 2 illustrates an example computing device 200 supporting operations associated with a restaurant incubator in accordance with this disclosure. The computing device 200 here could, for example, represent any of the devices 110, 114, 118, 120 shown in FIG. 1 and described above.

As shown in FIG. 2, the computing device 200 includes a bus system 202, which supports communication between at least one processing device 204, at least one storage device 206, at least one communications unit 208, and at least one input/output (I/O) unit 210.

The processing device 204 executes instructions that may be loaded into a memory 212. The processing device 204 may include any suitable number(s) and type(s) of processors or other devices in any suitable arrangement. Example types of processing devices 210 include microprocessors, microcontrollers, digital signal processors, field programmable gate arrays, application specific integrated circuits, and discreet circuitry.

The memory 212 and a persistent storage 214 are examples of storage devices 206, which represent any structure(s) capable of storing and facilitating retrieval of information (such as data, program code, and/or other suitable information on a temporary or permanent basis). The memory 212 may represent a random access memory or any other suitable volatile or non-volatile storage device(s). The persistent storage 214 may contain one or more components or devices supporting longer-term storage of data, such as a ready only memory, hard drive, Flash memory, or optical disc.

The communications unit 208 supports communications with other systems or devices. For example, the communications unit 208 could include a network interface card or a wireless transceiver facilitating communications over the network 112, 116. The communications unit 208 may support communications through any suitable physical or wireless communication link(s).

The I/O unit 210 allows for input and output of data. For example, the I/O unit 210 may provide a connection for user input through a keyboard, mouse, keypad, touchscreen, or other suitable input device. The I/O unit 210 may also send output to a display, printer, or other suitable output device.

Although FIG. 2 illustrates one example of a computing device 200 supporting operations associated with a restaurant incubator, various changes may be made to FIG. 2. For example, various components in FIG. 2 could be combined, further subdivided, omitted or rearranged and additional components could be added according to particular needs. As a particular example, the processing device 204 could be divided into multiple processors, such as one or more central processing units (CPUs) and one or more graphics processing units (GPUs). Also, computing devices can come in a wide variety of configurations, and FIG. 2 does not limit this disclosure to any particular computing device.

Figure 3:
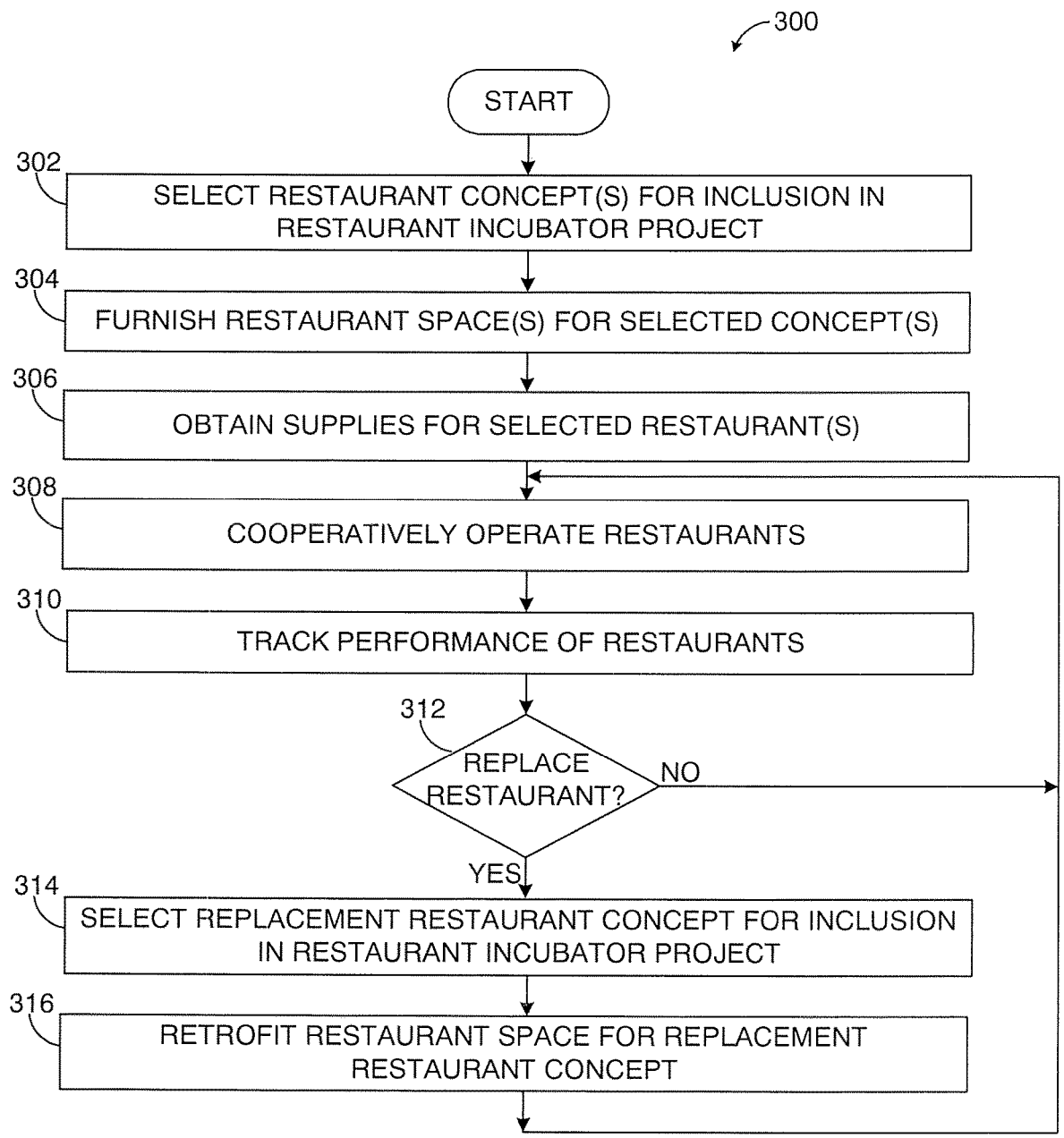
FIG. 3 illustrates an example method for restaurant incubation in accordance with this disclosure.

FIG. 3 illustrates an example method 300 for restaurant incubation in accordance with this disclosure. For ease of explanation, the method 300 is described with respect to a restaurant incubator that operates the facility 100 shown in FIG. 1. However, the method 300 could be used by a restaurant incubator with any other suitable facility or facilities.

As shown in FIG. 3, one or more restaurant concepts are selected for inclusion in a restaurant incubator project at step 302. This could include, for example, personnel of a restaurant incubator selecting one or more restaurant concepts that are unique, fill a void in the surrounding area, or otherwise meet one or more criteria of the restaurant incubator. Multiple restaurant concepts could be selected so that no two restaurant concepts in the incubator project would be in direct competition with one another. While multiple restaurants in the same area may indirectly compete with one another for customers, restaurants that serve the same type(s) of food may be viewed as directly competing for the same customer base. Thus, personnel of the restaurant incubator can select, for inclusion in the incubator project, restaurants that serve different types of food and that do not directly compete. However, this need not be the case, and restaurants that directly compete could be included in an incubator project.

One or more restaurant spaces for the one or more selected restaurant concepts are furnished at step 304. This could include, for example, personnel of the restaurant incubator or the restaurant operators having the needed or desired cooking equipment, storage equipment, tables, and other equipment installed in the restaurant spaces 102a-102n. As noted above, some, much, or all of the equipment may already be present in a restaurant space, and the restaurant operator for that space may only need to install the specific equipment and décor for a selected restaurant concept.

Supplies for the one or more restaurants are obtained at step 306. This could include, for example, personnel of the restaurant incubator or the restaurant operators placing orders for food ingredients, drinks, plates, bowls, silverware, and related items with the appropriate suppliers. As described below, the server computer 118 could combine supply orders from multiple restaurants, allowing larger orders to be placed and bulk discounts or other discounts to be obtained by the restaurant operators (which might not otherwise occur if the restaurant operators individually placed their supply orders).

Multiple restaurants in the incubator project are cooperatively operated at step 308. This could include, for example, each restaurant operator serving its own customers, running its own specials, and running its own advertisements. However, there can be various ways that the restaurant operators cooperate with one another to help increase the total flow of customers to the incubator project. For instance, the restaurant operators can schedule or participate in special events at the facility 100 or at nearby locations, such as marathons or other sporting events or special outdoor food festivals. As a specific example, the restaurant operators could cooperate in various "traveling" meal events, where a customer could sample an appetizer at one restaurant, a main course at a second restaurant, and a dessert at a third restaurant. Various other examples of ways in which restaurants can operate cooperatively are provided below.

The performances of the restaurants are tracked over time at step 310. This could include, for example, the server computer 118 collecting information identifying performances of multiple restaurants associated with the incubator project. The information could include information about sales and expenses (such as supply-related and employee-related expenses) for the various restaurants. The profitability of each restaurant could also be tracked over time, and predictions could optionally be made of the future profitability of each restaurant.

Based on this information, a decision can be made whether an existing restaurant in the incubator project should be replaced at step 312. This could include, for example, personnel of the restaurant incubator determining that a particular restaurant has remained unprofitable for too long a period of time. This could also include personnel of the restaurant incubator determining that a particular restaurant is less profitable than other restaurants in the project. This could further include personnel of the restaurant incubator determining that a particular restaurant (even if profitable) is unlikely to franchise or expand to other locations. In addition, this could include personnel of the restaurant incubator determining that another proposed restaurant concept is likely to be more profitable than an existing restaurant. In general, any suitable criteria could be used to decide whether to replace an existing restaurant in an incubator project.

If a decision is made to replace an existing restaurant in the incubator project, a replacement restaurant concept is selected at step 314, and the space of the existing restaurant is retrofitted for a new restaurant at step 316. Once again, the new restaurant concept can be selected in any suitable manner. Moreover, as described above, the new restaurant may use much of the same equipment as the prior restaurant. Thus, the restaurant space can be retrofitted more quickly and easily, such as by simply replacing the décor and making minor modifications in the dining, kitchen, or storage areas.

In this way, the restaurant incubator provides multiple operators with the opportunity to open restaurants and try out new restaurant concepts. As described below, the restaurant incubator can receive compensation for helping the operators open the restaurants in various ways. This can help to reduce the financial risks to the restaurant operators and provide them with operating experience, while at the same time providing an investment opportunity for owners or investors in the restaurant incubator.

Although FIG. 3 illustrates one example of a method 300 for restaurant incubation, various changes may be made to FIG. 3. For example, while shown as a series of steps, various steps in FIG. 3 could overlap, occur in parallel, occur in a different order, or occur any number of times. As a particular example, restaurants can open at different times within the incubator project. Thus, for instance, several restaurants could be operating cooperatively and having their performances tracked, while other restaurants are being selected or beginning operation.

Figure 4:
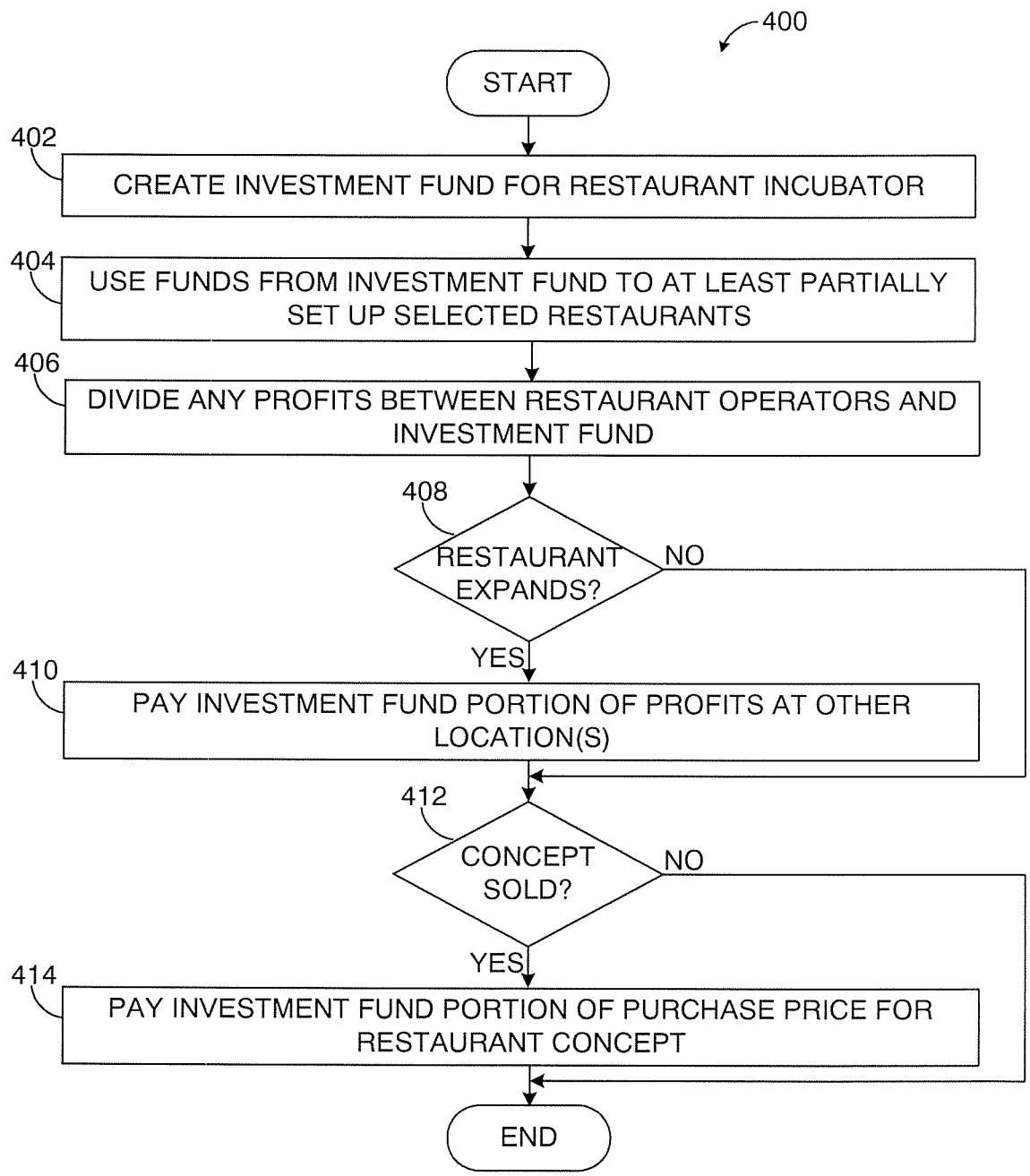
FIG. 4 illustrates an example method for funding restaurant incubation in accordance with this disclosure.

FIG. 4 illustrates an example method 400 for funding restaurant incubation in accordance with this disclosure. For ease of explanation, the method 400 is described with respect to a restaurant incubator that operates the facility 100 shown in FIG. 1. However, the method 400 could be used by a restaurant incubator with any other suitable facility or facilities.

As shown in FIG. 4, an investment fund is created for a restaurant incubator at step 402. This could include, for example, one or more owners of the restaurant incubator establishing a limited liability corporation or other legal entity. This could also include the restaurant incubator obtaining investments from individuals or other entities who are interested in investing in new restaurant concepts.

Funds from the investment fund are used to at least partially set up selected restaurant concepts in an incubator project at step 404. This could include, for example, personnel of the restaurant incubator using funds from the investment fund to cover the costs of rents, leases, or mortgage payments, property taxes, and insurance payments associated with the facility 100 itself or the land on which the facility 100 is located. This could also include personnel of the restaurant incubator using funds from the investment fund to cover the costs of restaurant equipment, supplies, signage, advertisements, and other expenses associated with setting up restaurants in the facility 100.

After the selected restaurants begin operation, the investment fund can receive investment returns in one or several ways. For example, any profits of a restaurant can be divided between the operator of the restaurant and the investment fund at step 406. The profits of each restaurant could be divided in any suitable manner, such as evenly split between the operator and investment fund or divided in some other manner. The profits could also be paid at any suitable interval, such as quarterly, semi-annually, or annually. Note that the same division and payment interval or different divisions or payment intervals could be used for different restaurants.

As another example, if a restaurant expands to one or more other locations beyond the incubator project at step 408, a portion of the profits at the new location(s) can be paid to the investment fund at step 410. For example, a percentage of the profits paid to the investment fund could vary based on several factors. As a particular example, the investment fund could be given the option of paying for at least part of a restaurant's expansion to another location. The investment fund could receive a smaller base percentage of the profits at the new location if the investment fund chooses not to pay for the expansion, and that percentage can become larger if the investment fund does choose to pay for at least part of the expansion. As a result, if personnel of the investment fund decide that an expansion at a particular location may be profitable, the investment fund could choose to contribute more to the new location, effectively buying the right to a larger share of the profits at the new location. Conversely, if personnel of the investment fund decide that an expansion at a new location may not be particularly profitable or otherwise desirable, the investment fund could choose to forego investing in the new location, choosing instead to retain a small base percentage of the profits at the new location.

As yet another example, a restaurant concept started in the incubator project could be sold, such as to a third party, at step 412. This could occur, for example, when a restaurant operator conceives of a unique, innovative, profitable, or otherwise marketable restaurant concept that is implemented within an incubator project. If a larger or more experienced restaurant operator wishes to expand that restaurant concept (such as to a bigger geographic area), the larger or more experienced restaurant operator could purchase the restaurant concept from the original operator. In this case, the investment fund could be paid a portion of the purchase price for the restaurant concept at step 414. For instance, a percentage of the purchase price paid to the investment fund could vary based on several factors. As a particular example, the percentage could be larger if the restaurant concept had already expanded to one or more other locations and the investment fund had helped to cover at least part of the cost of the expansion prior to the concept's purchase.

Although FIG. 4 illustrates one example of a method 400 for funding restaurant incubation, various changes may be made to FIG. 4. For example, while FIG. 4 illustrates the use of an investment fund for a restaurant incubator, a restaurant incubator could be funded in other ways, such as directly by the owner/operator of the restaurant incubator. Also, while FIG. 4 illustrates three example ways in which an investor can receive returns on an investment in a restaurant incubator project, other or additional types of payments could be made to an investor or owner/operator of the restaurant incubator. For instance, payments need not be made based on profits and could be based on other values, such as gross or net sales.

FIGS. 5 through 11 illustrate example methods for cooperatively operating restaurants in a restaurant incubator project in accordance with this disclosure. For ease of explanation, the methods shown in FIGS. 5 through 11 are described with respect to the restaurants operating in the facility 100 shown in FIG. 1 and as being supported by the server computer 118 shown in FIG. 1. However, the methods of FIGS. 5 through 11 could be used with any other suitable facility or facilities and with any other suitable device or devices.

Figure 5:
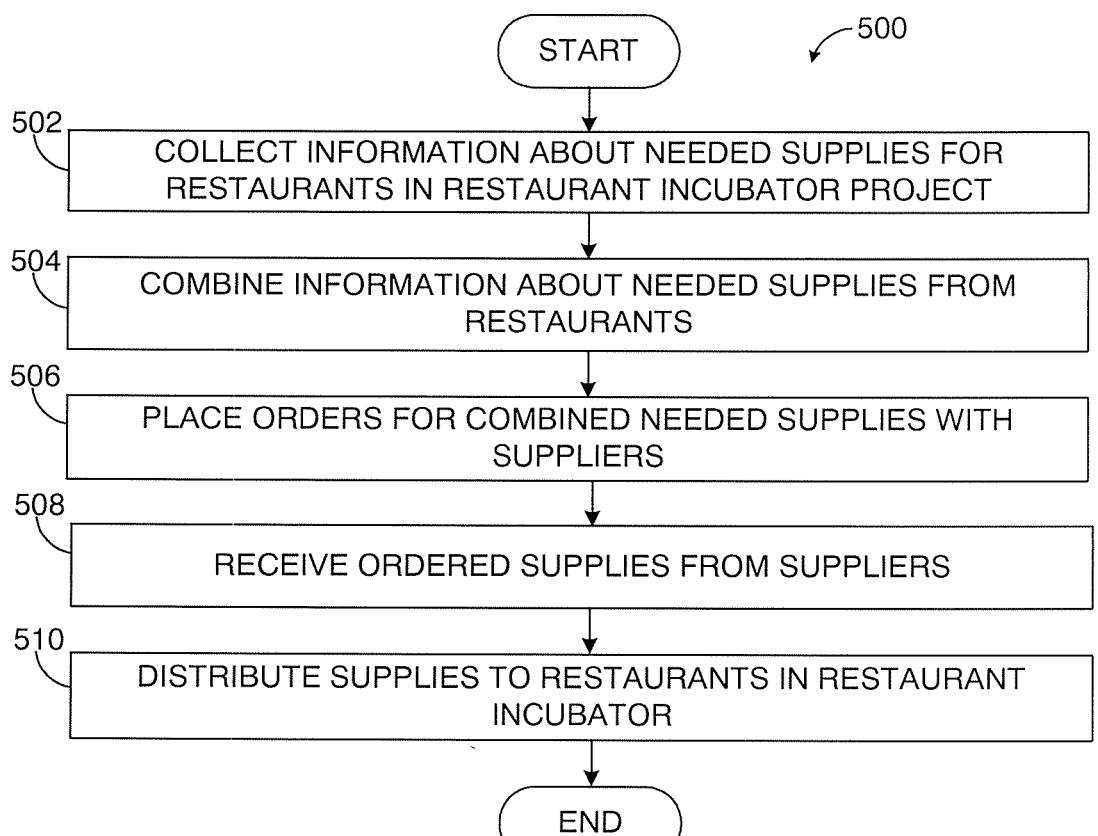
FIGS. 5 through 11 illustrate example methods for cooperatively operating restaurants in a restaurant incubator project in accordance with this disclosure.

FIG. 5 illustrates an example method 500 for combining supply orders for multiple restaurants in a restaurant incubator project in accordance with this disclosure. As shown in FIG. 5, information about needed supplies for restaurants in the restaurant incubator project is collected at step 502. This could include, for example, the server computer 118 collecting information from the computing devices 110 or the server computers 114 about supplies that are needed by the different restaurants operating in the facility 100. The needed supplies could represent food ingredients, drinks, napkins, straws, or other food/drink items.

The collected information could be provided by restaurant or other personnel or automatically collected. Moreover, the collected information could represent any suitable information related to the supplies needed or used by a restaurant. For instance, the information could represent indications from restaurant personnel that certain supplies are running low and need to be replenished. The information could also represent current stocks of supplies, which the server computer 118 could compare to threshold values in order to automatically reorder supplies. The information could further represent estimated stocks of supplies generated based on past or current sales at a restaurant or estimated needed stocks of supplies generated based on predicted future sales at a restaurant. In general, the information collected in step 502 represents any suitable information that identifies or that can be used to identify supplies needed or to be ordered by restaurants in the restaurant incubator project.

The collected information about supplies is combined at step 504, and orders for combined supplies are placed at step 506. This could include, for example, the server computer 118 identifying the supplies needed by all restaurants in the restaurant incubator project and placing orders for those supplies. As a particular example, this could include the server computer 118 combining all supply needs for meat products and placing one or more orders with the appropriate suppliers of the meat products. The same types of actions could occur for vegetable products, non-alcoholic drink products, alcoholic drink products, or other restaurant supplies.

When the ordered supplies are received from the suppliers at step 508, the supplies are distributed to the restaurants in the restaurant incubator project at step 510. The supplies can be delivered to and distributed from a central location (such as a location within or near the facility 100), or the supplies can be delivered individually to each restaurant.

By combining orders for multiple restaurants in this way, bulk discounts or other discounts from the suppliers can be obtained. These discounts might not otherwise be available if individual restaurant operators had to place individual orders for supplies with the same suppliers or with different suppliers. Note that while the method 500 is described as being performed partially using the server computer 118, the method 500 could also be performed using other devices or partially manually.

Figure 6:
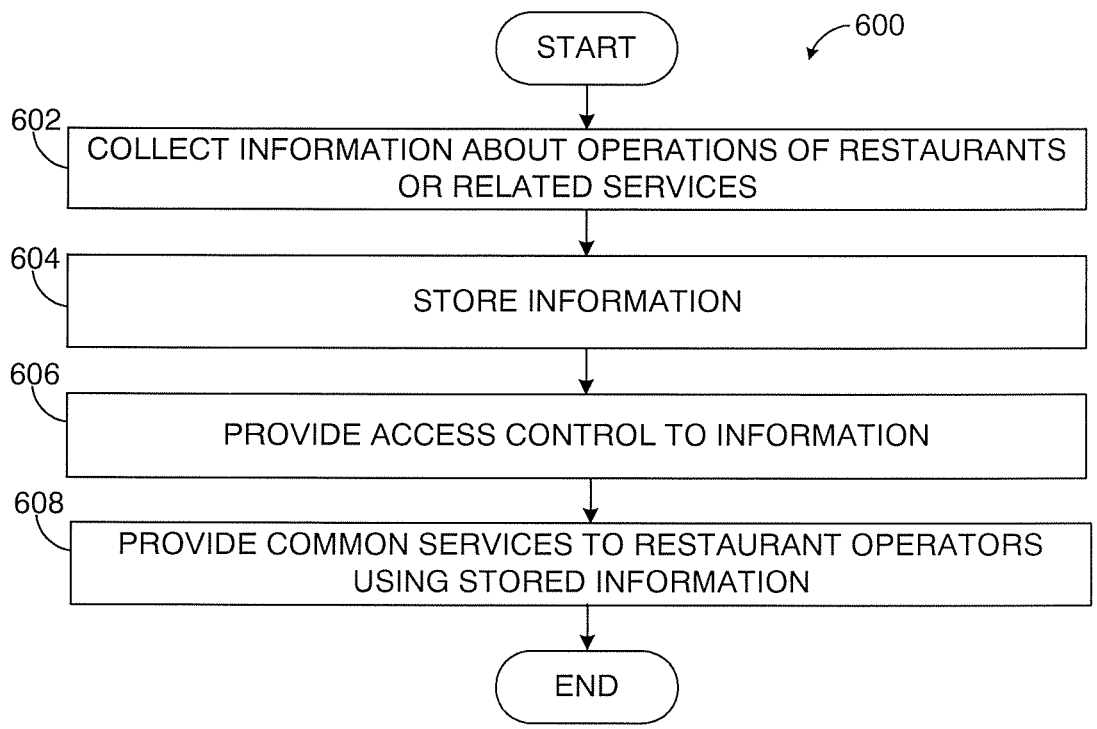

FIG. 6 illustrates an example method 600 for providing common services to restaurant operators for multiple restaurants in a restaurant incubator project in accordance with this disclosure. As shown in FIG. 6, information about operations of the restaurants in the restaurant incubator project (or services related thereto) is collected at step 602. This could include, for example, the server computer 118 collecting information from the computing devices 110 or the server computers 114 about one or more aspects of the restaurants and their operations. Any suitable types of information could be collected here, and example types of information are given below.

The information is stored at step 604, and access control to the stored information is provided at step 606. This could include, for example, storing the collected information in the database 122. This could also include the server computer 118 or the database 122 using username/password combinations or other access control mechanisms to control which data can be entered, viewed, modified, or deleted by a particular user.

One or more common services are provided to the restaurant operators using the stored information at step 608. This could include, for example, personnel of the restaurant incubator providing services to the restaurant operators. This could also include the server computer 118 allocating expenses associated with one or more common services amongst the various restaurant operators.

The type(s) of information collected and the type(s) of common service(s) provided to the restaurant operators could vary depending on the circumstances. The following represents example ways in which common services can be provided to the restaurant operators in an incubator project.

As a first example, a restaurant incubator or a collection of restaurants could hire one or more accounting or human resources (HR) personnel. The server computer 118 could collect various information needed for the accounting or HR personnel to provide services to the restaurant operators. As particular examples, the server computer 118 could collect information about hours worked by employees of the restaurants, sick time and vacation time earned or used by employees of the restaurants, and benefits earned or paid to employees of the restaurants. Using this information, HR personnel can help to verify compliance with various regulatory agencies, and accounting personnel can help file necessary tax forms with appropriate taxing agencies. The accounting or HR personnel could be compensated directly by the restaurant operators or indirectly, such as via the restaurant incubator.

As a second example, various services could be provided in or around the facility 100 for the joint benefit of multiple restaurants operating in the facility 100. For instance, security services could be used to patrol the facility 100, adjacent parking lots, or other areas at night or during operating times of the restaurants. Also, valet services could be provided for customers visiting one or more of the restaurants at the facility 100. The expenses for services such as these could be divided evenly or unevenly amongst all restaurants or a subset of the restaurants. As examples, security expenses could be divided evenly amongst all restaurants, while valet expenses could be divided amongst only those restaurants wishing to offer valet services. The server computer 118 could also track the usage of valet or other services and allocate the associated expenses based on usage of those services by the restaurants or other restaurants' customers.

As a third example, usage of utilities (such as electric, water, and gas utilities) in each restaurant space 102a-102n could be monitored. For example, meters could be installed in each restaurant space 102a-102n to measure electric, water, and gas usage. Utility bills could then be divided amongst the various restaurants in the facility 100 for payment. Utility payments could be made by the server computer 118 or by the restaurant incubator and then reimbursed by the restaurant operators, by one restaurant operator who is reimbursed by other restaurant operators, or in any other suitable manner.

As a fourth example, restaurant operators could pay rent for their restaurant spaces 102a-102n in the facility 100. The rent could represent a fixed amount or an amount that varies, such as a percentage rent that includes a base amount plus a percentage of any profits. The server computer 118 could send rent reminders to restaurant operators and receive rent payments from restaurant operators. The server computer 118 could also calculate any non-fixed rents or rent components, such as profit-based components of rent. Note that the restaurant incubator could also own, lease, or rent the facility 100 or the land on which the facility 100 is located and could charge rent to the restaurant operators.

These represent examples of the types of ways in which common services can be provided to restaurant operators operating within the facility 100. However, a wide variety of other services could be provided to or for restaurant operators operating within a restaurant incubator project, and the above examples do not limit this disclosure to these particular examples.

Note that while the method 600 is described as being performed partially using the server computer 118, the method 600 could also be performed using other devices or partially manually. However, the use of the server computer 118 or other computing device could help to significantly simplify information collection, usage, and analysis.

Figure 7:
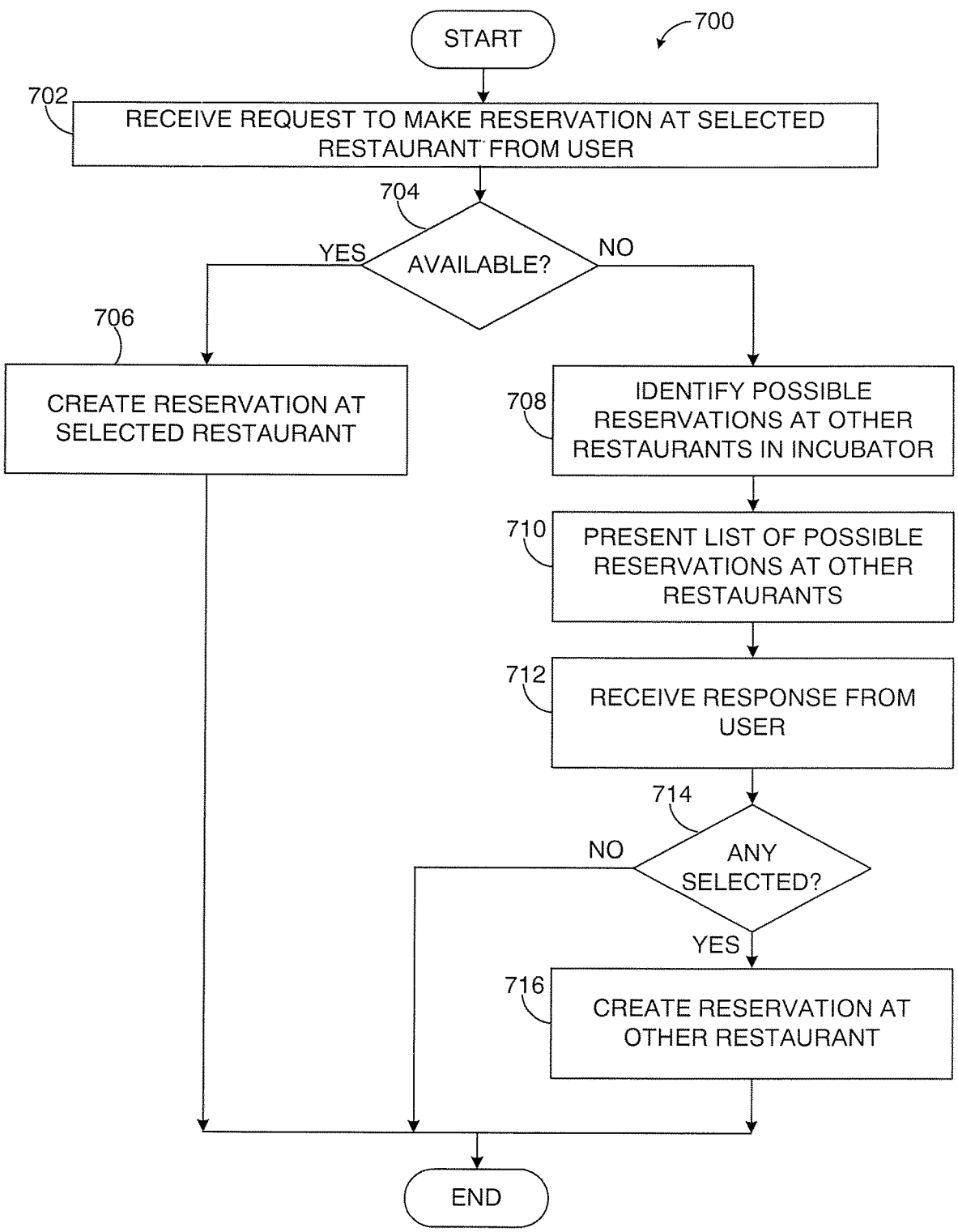

FIG. 7 illustrates an example method 700 for creating reservations at restaurants in a restaurant incubator project in accordance with this disclosure. As shown in FIG. 7, a request to make a reservation at a restaurant in an incubator project is received at step 702. This could include, for example, receiving a request for a reservation over the Internet, by text message, by email, or by phone. As a particular example, this could include the server computer 118 receiving a request directly over the Internet (such as via a webpage supported by or associated with the server computer 118) or indirectly via a third-party server. The request could identify a desired reservation time and a number of guests for a specified restaurant.

A check is made whether there is space available in the specified restaurant at the desired reservation time for the identified number of guests at step 704. If so, the reservation is created at step 706. This could include, for example, the server computer 118 recording information about the reservation and sending one or more confirmation messages.

If the requested reservation cannot be satisfied, possible reservations at one or more other restaurants in the incubator project are identified at step 708. This could include, for example, the server computer 118 identifying other restaurants in the incubator project that could seat the requested number of guests at the desired time. A list of the identified alternate possible reservations is presented at step 710. This could include, for example, the server computer 118 presenting information identifying the alternate possible reservations to the user via a webpage. A response from the user is received at step 712, and a determination is made whether the user selected any of the alternate possible reservations at step 714. If so, a reservation is created at one of the other restaurants in the restaurant incubator project at step 716. This could include, for example, the server computer 118 recording information about the reservation and sending one or more confirmation messages.

If the method 700 ends without a reservation being made, the method 700 could be repeated. For example, the user could resubmit a reservation request with a different time, number of guests, or specified restaurant.

Figure 8:
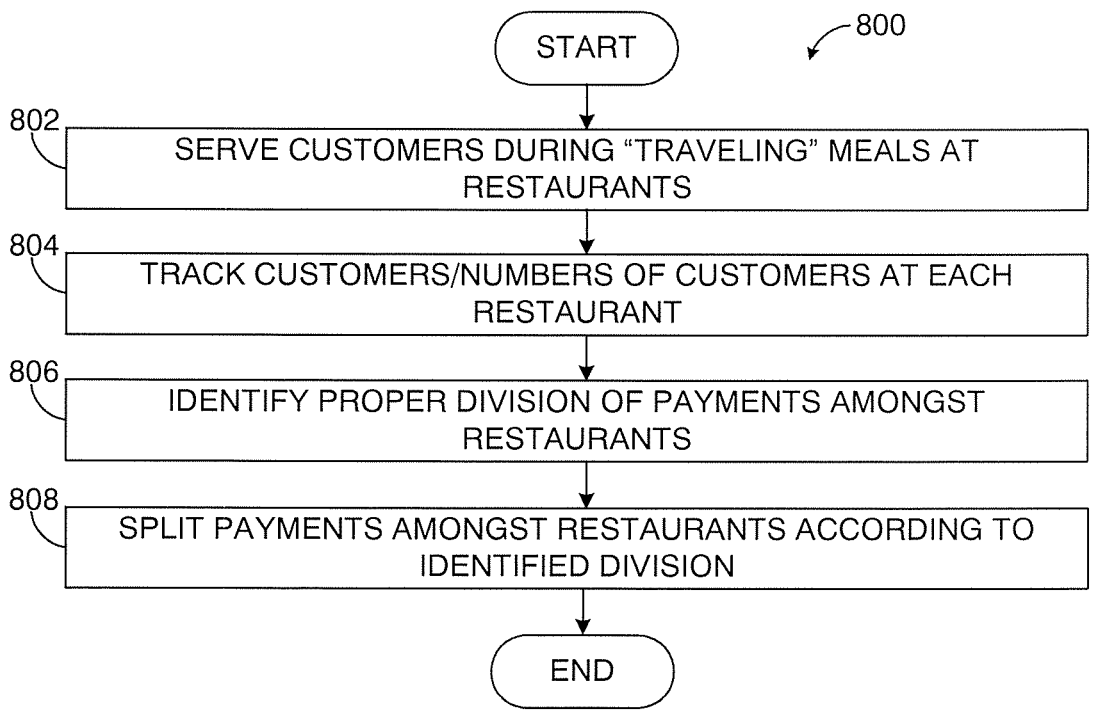

FIG. 8 illustrates an example method 800 for supporting "traveling" meal events at restaurants in a restaurant incubator project in accordance with this disclosure. As shown in FIG. 8, customers are served during the "traveling" meal event at step 802. This could include, for example, restaurants serving various customers, where each customer could order an appetizer at one restaurant, a main course at a second restaurant, and a dessert at a third restaurant. Note, however, that any number(s) and course(s) could be served at any number of restaurants during the event. Also note that customers could freely choose the restaurant for each course, or specified restaurants could serve the various courses.

Customers or the number of customers at each restaurant are tracked during the event at step 804. This could include, for example, the server computer 118 tracking the number of customers who eat a specified course at each restaurant in the incubator project or each restaurant participating in the event. The tracking could be done in any suitable manner, such as by tracking the number of orders placed at each restaurant or by tracking what each individual customer or each group of customers orders at each restaurant.

Using this information, a proper division of payments amongst the restaurants is identified at step 806. This could include, for example, the server computer 118 identifying a specified monetary value assigned to each course of the event. This could also include the server computer 118 using the monetary values and the number of customers eating each course at each restaurant to identify how much each restaurant earned during the event.

Payments are split amongst the restaurants according to the identified division at step 808. For example, a single restaurant could collect payments for the event, and this step could include the server computer 118 identifying the proper division and the single restaurant's operator paying the other restaurants' operators. If multiple restaurants collect payments for the event, this could include the server computer 118 identifying the proper division and optionally the payments to be made amongst the restaurants. Automatic funds transfers could then be triggered, or the restaurants' operators could make payments amongst themselves. If a third party (such as the restaurant incubator) collects payments for the event, this could include the server computer 118 identifying the proper division and optionally triggering payments to the restaurant operators.

Note that while the method 800 is described as being performed partially using the server computer 118, the method 800 could also be performed using other devices or partially manually. However, the use of the server computer 118 or other computing device could help to significantly simplify the proper allocation of money amongst multiple restaurants for an event.

Figure 9:
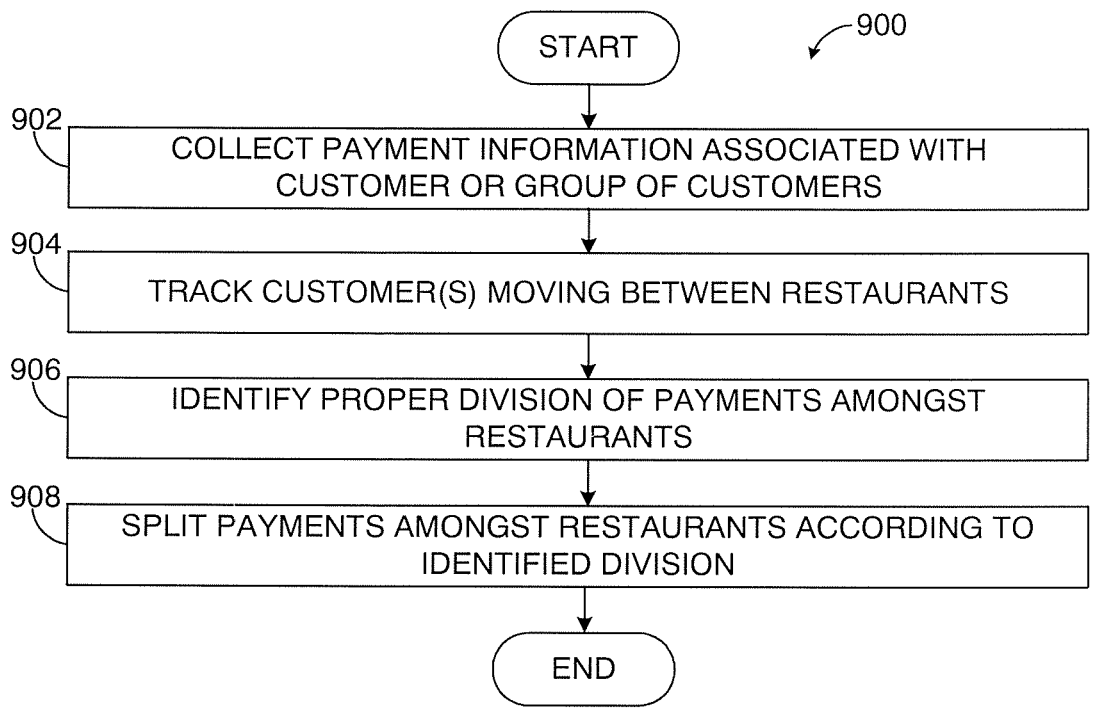

FIG. 9 illustrates an example method 900 for supporting a "floating" check or tab at restaurants in a restaurant incubator project in accordance with this disclosure. As shown in FIG. 9, payment information is collected from a customer or group of customers at step 902. This could include, for example, a first restaurant or the restaurant incubator collecting credit or debit card information from a customer or group of customers. This could also include identifying a maximum amount of money that the customer or group of customers wishes to charge to a credit or debit card during a visit to the restaurants.

The customer or group of customers is tracked as the customer or group of customers moves between restaurants at step 904. This could include, for example, tracking the customer(s) using a wireless tracking device, a customer's mobile telephone, a bar code or other printed receipt, or in any suitable manner. During this time, the customer or group of customers could roam from one restaurant to another, possibly ordering different items at different restaurants. As a particular example, the customer(s) could order drinks at the bar of one restaurant while waiting for a table for dinner at another restaurant, and afterwards the customer(s) could order dessert at a third restaurant.

Using this information, a proper division of payments amongst the restaurants is identified at step 906. This could include, for example, the server computer 118 identifying a specified monetary value billed to the customer or group of customers by each restaurant. Payments are split amongst the restaurants according to the identified division at step 908. For example, a last restaurant visited by a customer or group of customers could collect payment from the customer(s), and this step could include the server computer 118 identifying the proper division and the single restaurant's operator paying the other restaurants' operators. If a third party (such as the restaurant incubator) collected payment information from the customer(s), this could include the server computer 118 identifying the proper division and optionally triggering payments to the restaurant operators.

Note that while the method 900 is described as being performed partially using the server computer 118, the method 900 could also be performed using other devices. However, the use of the server computer 118 or other computing device could help to significantly simplify the proper allocation of money amongst multiple restaurants.

Figure 10:
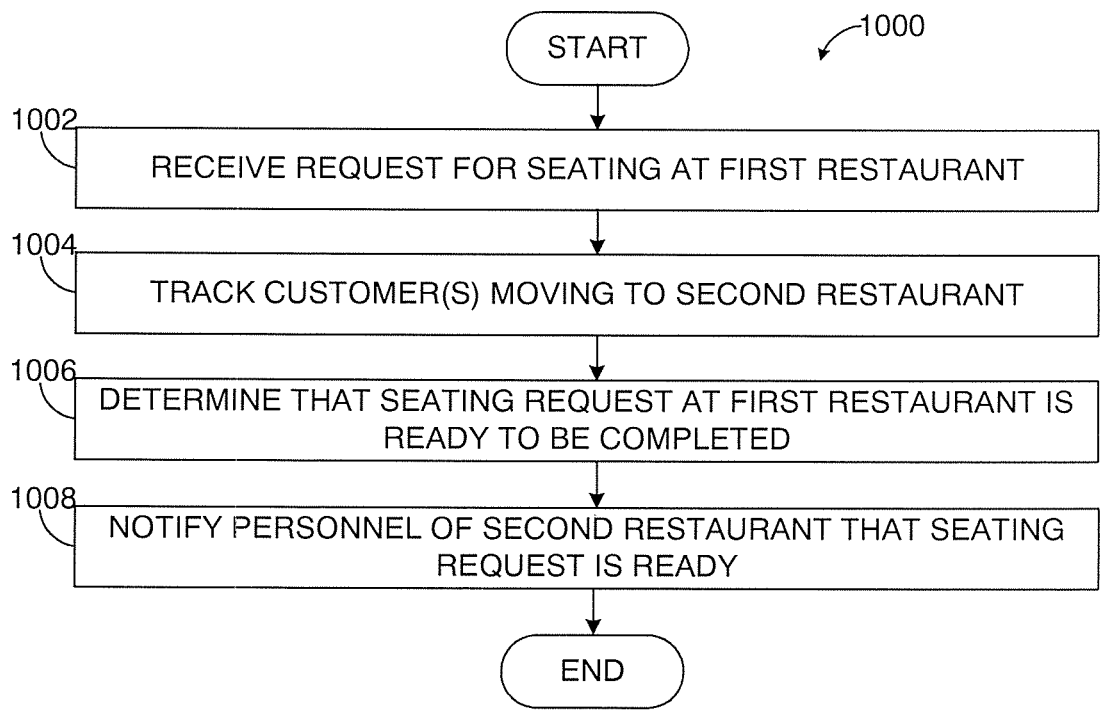

FIG. 10 illustrates an example method 1000 for supporting seating request notifications for customers of restaurants in a restaurant incubator project in accordance with this disclosure. As shown in FIG. 10, a seating request is received at a first restaurant at step 1002. This could include, for example, a customer or group of customers requesting a table at a first restaurant. However, the first restaurant cannot satisfy this request immediately and instead gives the customer(s) an estimated wait time for a table.

The customer or group of customers is tracked as the customer or group of customers moves to a second restaurant at step 1004. This could include, for example, tracking the customer(s) using a wireless tracking device, a customer's mobile telephone, a bar code or other printed receipt, or in any suitable manner. During this time, the customer or group of customers could go to a bar or other area at the second restaurant and wait for a table at the first restaurant to be prepared.

A determination is made that the seating request at the first restaurant is ready to be completed at step 1006. This could include, for example, personnel of the first restaurant indicating to the server computer 118 or other computing device that a table for the customer(s) is ready. At that point, the customer(s) can be notified in any suitable manner. In this example, personnel of the second restaurant may be notified that the customer(s) table is ready, and the personnel of the second restaurant could relay that information to the customer(s). However, any other suitable notification approach (such as audible or visual signaling by a wireless tracking device) could be used.

Note that while the method 1000 is described as being performed partially using the server computer 118, the method 1000 could also be performed using other devices or partially manually. However, the use of the server computer 118 or other computing device could help to significantly simplify notification of customers while allowing the customers to move within an incubator project during wait times.

Figure 11:
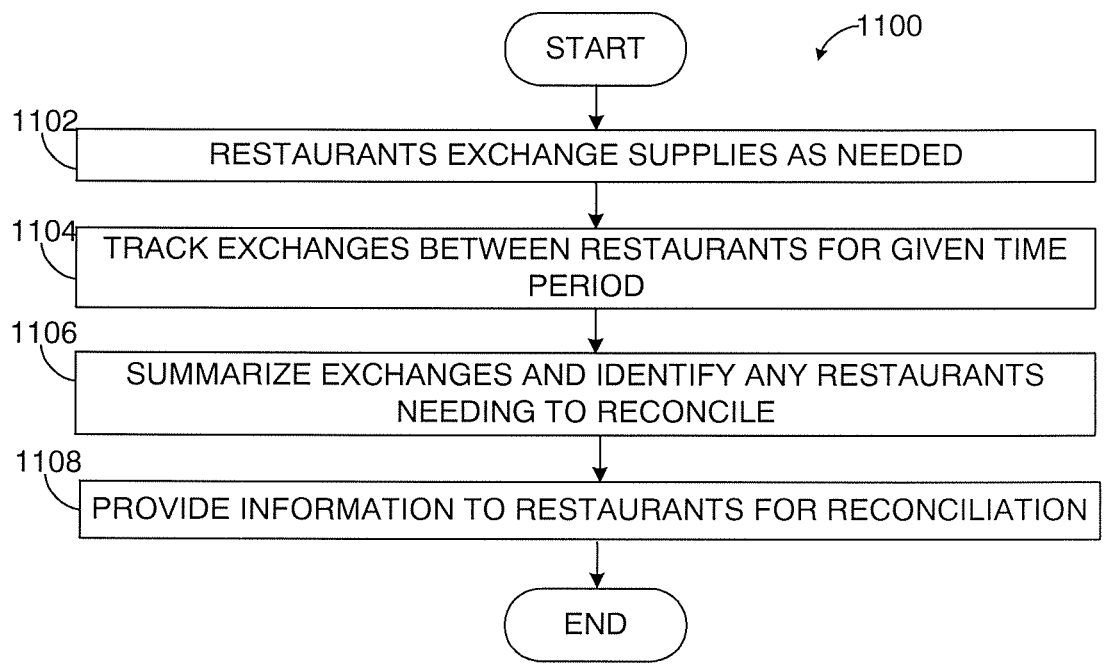

FIG. 11 illustrates an example method 1100 for supply exchanges at restaurants in a restaurant incubator project in accordance with this disclosure. As shown in FIG. 11, restaurants in the incubator project can exchange supplies as needed at step 1102. This could include, for example, one restaurant providing food, drink, or other specified item(s) to another restaurant that is running low on or that has run out of the specified item(s). This could occur any number of times between any of the restaurants in the incubator project.

The exchanges amongst the restaurants in the incubator project are tracked for a given time period at step 1104. This could include, for example, the server computer 118 receiving information identifying the exchanges from the computing devices 110 or the server computers 114. As a particular example, this could include the server computer 118 receiving an indication from one restaurant that supplies are being provided to another restaurant and optionally receiving confirmation from the other restaurant. The time period could represent any suitable length of time, such as a single day, week, month, or other amount of time.

The exchanges for the given time period are summarized and any restaurants needing to reconcile for the exchanges are identified at step 1106. This could include, for example, the server computer 118 using known costs associated with the supplies (such as from previous or current supply orders) to identify the monetary value of each exchange. This could also include the server computer 118 using the monetary values of the exchanges to identify if any restaurant accepted supplies with a total value that exceeded the total value of the supplies that the restaurant provided to others.

This information could then be used in any suitable manner. For example, as shown in FIG. 11, the information could be provided to the restaurants for reconciliation. This could include, for example, the server computer 118 providing the summary to the restaurant operators, who could then make payments, provide supplies, or otherwise reconcile what is owed. However, other manual or automated operations could occur. For instance, the server computer 118 could initiate automatic payments between restaurants or track the amounts owed for future reconciliations or offsets.

Note that while the method 1100 is described as being performed partially using the server computer 118, the method 1100 could also be performed using other devices or partially manually. However, the use of the server computer 118 or other computing device could help to significantly simplify the tracking and reconciliation of supply exchanges between restaurants.

Although FIGS. 5 through 11 illustrate various examples of methods for cooperatively operating restaurants in a restaurant incubator project, various changes may be made to FIGS. 5 through 11. For example, there are a wide variety of other ways in which multiple restaurants in a restaurant incubator project could interact and cooperate. These figures are meant to illustrate several examples of the ways in which multiple restaurants in the restaurant incubator could interact and cooperate, possibly with the support of the server computer 118 or other computing device(s). Also, other techniques could be used to support consolidated supply orders, common service provisioning, reservations, traveling meal events, and supply exchanges.

Figure 12:
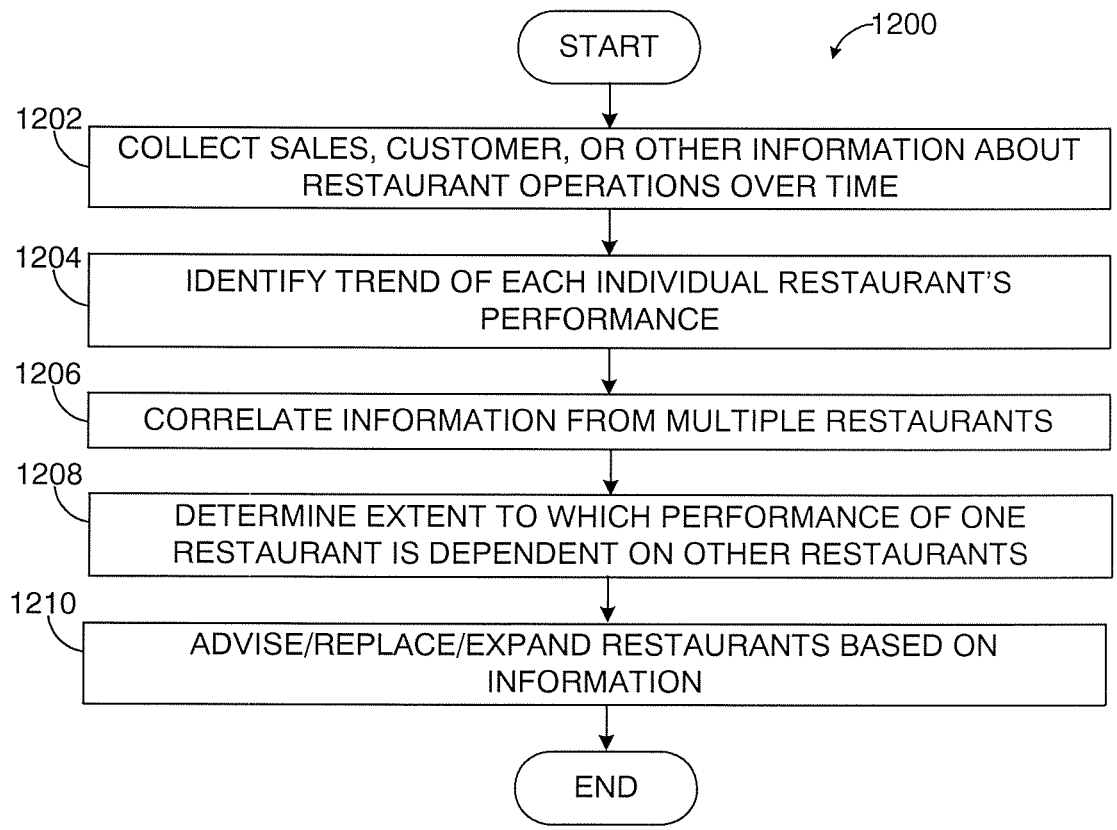
FIG. 12 illustrates an example method for tracking performance of restaurants in a restaurant incubator project in accordance with this disclosure.

FIG. 12 illustrates an example method 1200 for tracking performance of restaurants in a restaurant incubator project in accordance with this disclosure. For ease of explanation, the method 1200 is described with respect to a restaurant incubator that operates the facility 100 shown in FIG. 1 and as being supported by the server computer 118 shown in FIG. 1. However, the method 1200 could be used by a restaurant incubator with any other suitable facility or facilities and with any other suitable device or devices.

As shown in FIG. 12, various information about restaurant operations is collected over a period of time at step 1202. This could include, for example, the server computer 118 collecting information about gross sales, number of customers, profits, or any other or additional information about the restaurants operating in the restaurant incubator. The information could be collected over any suitable period of time, such as at least six months or a year. The information could be collected from the computing devices 110 or the server computers 114 or partially manually or automatically provided via the computing devices 120. The information could be collected in any other suitable manner.

The trend of each restaurant's individual performance is identified at step 1204. This could include, for example, the server computer 118 identifying trends in each restaurant's number of customers and profitability, although any other or additional trends could also be identified. Any suitable types of analyses could be performed by the server computer 118 to identify the performance trends, such as analyses that estimate future performance based on historical information. Note, however, that historical plots of the performance trends could also be used without making estimations of future performance.

Information is correlated between multiple restaurants at step 1206, and a determination is made of the extent that one restaurant's performance may be dependent on other restaurants at step 1208. This could include, for example, the server computer 118 correlating the performances of the restaurants over time and determining whether there are any relationships between the performances of different restaurants.

As a particular example, the server computer 118 could correlate peak customer visits to the restaurants in order to identify whether a specified restaurant is visited more frequently only when adjoining restaurants are very busy. If the specified restaurant is busy at times when the adjoining restaurants are not full, this could indicate that the specified restaurant is successful on its own. If the specified restaurant is busy only at times when the adjoining restaurants cannot seat additional guests, this could indicate that the specified restaurant is benefiting primarily from overflow customers from the adjoining restaurants (rather than attracting its own customers).

All of this information can be used to advise the restaurant operators or make decisions about replacing or expanding the restaurants in the incubator project at step 1210. This could include, for example, personnel of the restaurant incubator looking at the trends of the existing restaurants to identify restaurant concepts that might need replacing or that might be able to expand to other locations. This could also include personnel of the restaurant incubator using the correlations between restaurants to identify those restaurants that benefit primarily from overflow customers from adjoining restaurants, where the identified restaurants are then subject to additional advertising, advisement, or replacement.

Note that while the method 1200 is described as being performed partially using the server computer 118, the method 1200 could also be performed using other devices or partially manually. However, the use of the server computer 118 or other computing device could help to significantly simplify performance tracking and data correlation operations.

Although FIG. 12 illustrates one example of a method 1200 for tracking performance of restaurants in a restaurant incubator project, various changes may be made to FIG. 12. For example, the performances of the restaurants could be used without considering the correlations between the restaurants' performances. Also, a wide variety of analytical techniques could be used to analyze a wide variety of data associated with restaurants in order to manage or make decisions about restaurants. FIG. 12 is merely meant to illustrate one example way in which the performances of restaurants in a restaurant incubator project could be identified and used.

In the above description, the server computer 118 has been described as performing various functions associated with a restaurant incubator or a restaurant incubator project. It should be noted that the logic executed by the server computer 118 could be centralized in one or more devices/systems or distributed across multiple devices/systems. Also, any combination of the functions described above could be implemented with the server computer 118 as needed or desired.

Although this disclosure has been described with respect to example embodiments, various modifications and changes may be suggested to one skilled in the art. It is intended that this disclosure encompass such changes and modifications as fall within the scope of the appended claims.

What is claimed is:

1. An apparatus comprising:
at least one memory configured to store information identifying performances of multiple restaurants and store order information including tabs of a customer at the multiple restaurants and payment information related to the customer; and
at least one processor configured to:
detect a mobile device associated with the customer wirelessly connecting to a wireless network of a first restaurant of the multiple restaurants;
identify the payment information related to the detected mobile device;
receive, from a first restaurant device at the first restaurant, a first tab for at least one first order associated with the mobile device;
update the order information for the customer with the first tab based on the detected mobile device associated with the at least one first order;
track a movement of the mobile device from the first restaurant to a second restaurant of the multiple restaurants based on the mobile device transferring from the wireless network of the first restaurant to a wireless network of the second restaurant;
receive, from a second restaurant device at the second restaurant, a second tab for at least one second order without receiving the payment information;
update the order information for the customer with the second tab based on the mobile device with the at least one second order;
receive finalized payment based on the order information using the payment information, wherein the payment information is only applied to the finalized payment;
identify a division of the finalized payment for the first tab and the second tab, from different restaurants, associated with the mobile device; and
trigger payments to the first restaurant device and the second restaurant device based on the identified division of the finalized payment.

2. The apparatus of claim 1, wherein the information identifying the performances of the restaurants comprises at least one of: gross sales of the restaurants, numbers of customers served by the restaurants, and profits of the restaurants.

3. The apparatus of claim 1, wherein the at least one processor is further configured to identify a trend in each restaurant's performance.

4. The apparatus of claim 1, wherein the at least one processor is configured to correlate the performances of the restaurants by correlating peak customer visits to the restaurants over time.

5. The apparatus of claim 4, wherein the at least one processor is configured to correlate the peak customer visits to identify whether a specified one of the restaurants is visited more frequently when others of the restaurants are busier.

6. The apparatus of claim 1, wherein the at least one processor is further configured to:
collect information about supplies needed by the restaurants; and
combine the information about the supplies in order to consolidate supply orders for the multiple restaurants.

7. The apparatus of claim 1, wherein the at least one processor is further configured to:
collect information about services common to two or more of the restaurants; and
divide payments for the services among the two or more restaurants.

8. The apparatus of claim 1, wherein the at least one processor is further configured to:
receive a reservation request for a specified one of the restaurants;
determine that the reservation request cannot be satisfied for the specified restaurant;
identify one or more others of the restaurants that are able to satisfy the reservation request; and
provide a list identifying the one or more other restaurants that are able to satisfy the reservation request to a user.

9. The apparatus of claim 1, wherein the at least one processor is further configured to:
collect information about exchanges of supplies between the restaurants; and
identify any of the restaurants needed to reconcile with others of the restaurants as a result of the exchanges.

10. A non-transitory computer readable medium embodying a computer program, the computer program comprising computer readable program code that when executed causes at least one processor to:

obtain information identifying performances of multiple restaurants;

detect a mobile device associated with a customer wirelessly connecting to a wireless network of a first restaurant of the multiple restaurants;

identify payment information related to the detected mobile device;

receive, from a first restaurant device at the first restaurant, a first tab for at least one first order associated with the mobile device;

update order information for the customer with the first tab based on the detected mobile device associated with the at least one first order, wherein the order information includes tabs of the customer at the multiple restaurants;

track a movement of the mobile device from the first restaurant to a second restaurant of the multiple restaurants based on the mobile device transferring from the wireless network of the first restaurant to a wireless network of the second restaurant;

receive, from a second restaurant device at the second restaurant a second tab for at least one second order without receiving the payment information;

updating the order information for the customer with the second tab based on the detected mobile device with the at least one second order;

receive finalized payment based on the order information using the payment information, wherein the payment information is only applied to the finalized payment;

identify a division of the finalized payment for the first tab and the second tab, from different restaurants, associated with the mobile device; and trigger payments to the first restaurant device and the second restaurant device based on the identified division of the finalized payment.

11. The non-transitory computer readable medium of claim 10, wherein the information identifying the performances of the restaurants comprises at least one of: gross sales of the restaurants, numbers of customers served by the restaurants, and profits of the restaurants.

12. The non-transitory computer readable medium of claim 10, wherein the computer program further comprises computer readable program code that when executed causes the at least one processor to identify a trend in each restaurant's performance.

13. The non-transitory computer readable medium of claim 10, wherein the computer program comprises computer readable program code that when executed causes the at least one processor to correlate peak customer visits to the restaurants over time.

14. The non-transitory computer readable medium of claim 13, wherein the computer program comprises computer readable program code that when executed causes the at least one processor to correlate the peak customer visits to identify whether a specified one of the restaurants is visited more frequently when others of the restaurants are busier.

15. The non-transitory computer readable medium of claim 10, wherein the computer program further comprises computer readable program code that when executed causes the at least one processor to:

collect information about supplies needed by the restaurants; and combine the information about the supplies in order to consolidate supply orders for the multiple restaurants.

16. The non-transitory computer readable medium of claim 10, wherein the computer program further comprises computer readable program code that when executed causes the at least one processor to:

collect information about services common to two or more of the restaurants; and divide payments for the services among the two or more restaurants.

17. The non-transitory computer readable medium of claim 10, wherein the computer program further comprises computer readable program code that when executed causes the at least one processor to:

receive a reservation request for a specified one of the restaurants;

determine that the reservation request cannot be satisfied for the specified restaurant;

identify one or more others of the restaurants that are able to satisfy the reservation request; and provide a list identifying the one or more other restaurants that are able to satisfy the reservation request to a user.

18. The non-transitory computer readable medium of claim 10, wherein the computer program further comprises computer readable program code that when executed causes the at least one processor to:

collect information about exchanges of supplies between the restaurants; and identify any of the restaurants needed to reconcile with others of the restaurants as a result of the exchanges.

* * * * *